United States Patent [19]
Hamilton

[11] 3,762,903
[45] Oct. 2, 1973

[54] PROCESS FOR BENDING GLASS TO A RELATIVELY SHARP ANGLE

[75] Inventor: Harold E. Hamilton, Toledo, Ohio

[73] Assignee: Libbey-Owens-Ford Company, Toledo, Ohio

[22] Filed: Apr. 20, 1971

[21] Appl. No.: 135,564

[52] U.S. Cl............... 65/107, 65/40, 65/DIG. 4
[51] Int. Cl............................................ C03b 23/02
[58] Field of Search............... 65/106, 107, DIG. 4, 65/40

[56] References Cited
UNITED STATES PATENTS
2,176,999   10/1939   Miller ................................. 65/107

FOREIGN PATENTS OR APPLICATIONS
331,784   9/1958   Switzerland................... 65/DIG. 4

Primary Examiner—Arthur D. Kellogg
Attorney—Collins and Oberlin

[57] ABSTRACT

A process for bending a glass sheet or a pair of glass sheets to a relatively sharp angle which comprises forming an electrically conducting path on the sheet along a line about which it is desired to bend the sheet, and passing an electric current through the path to heat the sheet adjacent the path to a temperature above the bending point of the glass. The sheet is then caused to be bent along the electrically conducting path to form a generally V-shaped glazing.

10 Claims, 7 Drawing Figures

PATENTED OCT 2 1973

3,762,903

INVENTOR.
Harold E. Hamilton
BY
Collins & Oberlin
ATTORNEYS

PROCESS FOR BENDING GLASS TO A RELATIVELY SHARP ANGLE

The present invention relates generally to the bending of glass sheets or plates and more particularly relates to an improved method of bending glass sheets to relatively sharp angles.

Automobile stylists and designers have always been faced with the difficulty of incorporating glass into their designs. However, with the development of very sophisticated glass bending processes which have enabled the production of so-called cap and wrap-around windshields and backlights, many of the difficulties of maintaining the desired design through the glass portions have been eliminated. In this connection it is often desirable to shape or form the glass to carry out styling features found in the adjacent sheet metal panel in order to create the appearance of unity between the glass and the sheet metal. For example, it may be desirable to provide a generally vertically extending sharp bend in a windshield or backlight in continuation of a bead or molding strip on the surface of the hood, roof panel or deck lid. At times it may also be desirable to form a sharp bend in either a horizontal or vertical direction to affect wrap around of a windshield or backlight into the roof line of the vehicle or into the side surface thereof. Bends of this nature, i.e., V-bends or bends of very small radius of curvature, have remained extremely difficult to obtain.

It is, accordingly, an object of the present invention to provide an improved method of bending a glass sheet or a pair of glass sheets to a sharp angle.

Another object of the invention is the provision of a method of the above character in which distortion in the area of the bend is minimized.

It is a further object of the invention to provide a method of the type described which permits a more rapid bending of a glass sheet with greater economy and with less danger of marring the glass than with processes heretofore proposed.

Other objects and advantages of the invention will become more apparent during the course of the following description when taken in connection with the accompanying drawings.

In the drawings wherein like numerals are employed to designate like parts throughout the same:

Figures 1, 2, 3, 4, 5, 6, 7:
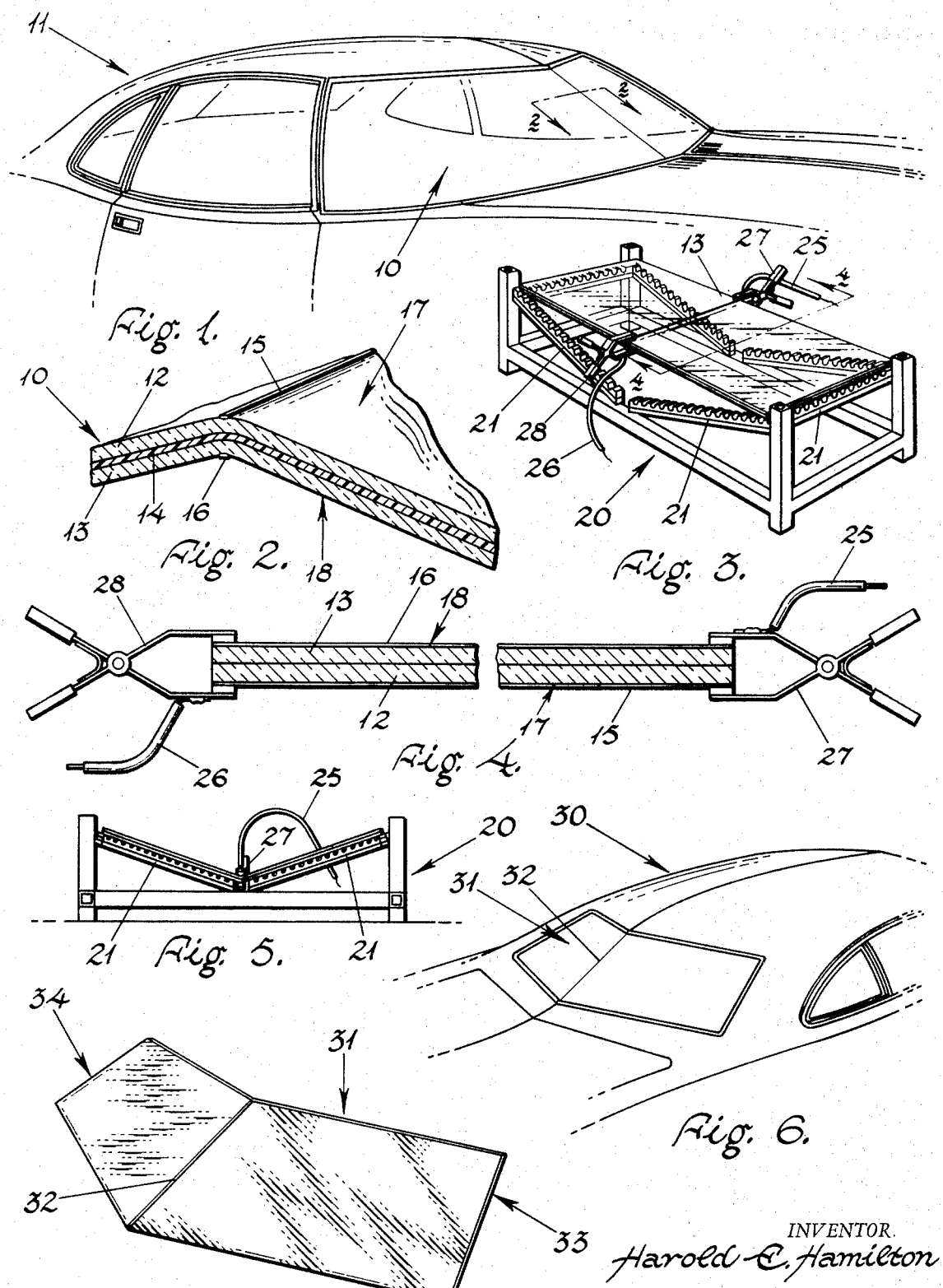
FIG. 1 is a perspective view of an automobile including a bent laminated glass windshield structure produced in accordance with the present invention.
FIG. 2 is a sectional view taken along the line 2—2 of FIG. 1.
FIG. 3 is a perspective view showing a pair of glass sheets in position on a mold prior to initiation of the bending portion of the process in accordance with this invention.
FIG. 4 is a sectional view taken along the line 4—4 of FIG. 3.
FIG. 5 is a sectional view showing the pair of glass sheets supported on the mold upon the conclusion of the bending process.
FIG. 6 is a perspective view of an automobile including a backlight comprised of a single sheet of glass bent in accordance with the present invention.
FIG. 7 is a perspective view of the backlight illustrated in FIG. 6.

Generally stated, the present invention provides a process for bending a glass sheet to a relatively sharp angle which comprises first forming an electrically conducting path on at least one surface of a flat sheet of glass to be bent. This path is made to extend continuously along a substantially straight line from one edge of the sheet to the opposite edge. The glass sheet is then preferably placed in or passed through a furnace in order to heat the sheet to an elevated temperature but below the bending temperature of the glass. An electric current is then passed through the electrically conducting path to heat the same by resistance and in turn heat the sheet in the area immediately adjacent the path by conduction to a temperature above 1,000° F. or above its bending temperature. At this point, the sheet is caused to bend, for example, by gravity, along the path or line to form a generally V-shaped structure.

Referring now more particularly to the drawings, there is illustrated in FIG. 1 a windshield 10 produced in accordance with this invention as it appears from the outside of an automobile 11 in which the windshield is mounted. The windshield 10 is of a conventional laminated construction in that it comprises two sheets of glass 12 and 13 and a non-brittle thermoplastic interlayer 14, e.g., composed of a polyvinyl butyral resin, all bonded together to form an integral structure.

The windshield 10 is of V-shaped configuration, being bent along a straight line path extending from one longitudinal edge of the glass sheets to the other medially of and parallel to the transverse edges. The path or axis of the bend is defined by a pair of fired electrically conducting frit lines 15 and 16 formed in the particular embodiment illustrated on the outboard surface 17 of the outboard glass sheet 12 and the outboard surface 18 of the inboard sheet 13. The purpose and nature of the frit bands 15 and 16 will subsequently be discussed in detail.

The glass sheets of the windshield assembly 10 are bent upon a ring or skeleton type mold indicated generally at 20 in FIGS. 3 and 5. Molds of this type are conventionally used for the bending of glass and have a peripheral rail 21, the top edge of which forms the shaping surface for forming the glass. In accordance with present-day practice, the rail 21 may be either a substantially single piece stationary member as shown or formed of articulated sections which are moved during the bending of the glass from an open glass-receiving position to a closed, final position.

Prior to positioning the glass sheets on the bending mold 20, the electrically conducting paths 15 and 16 are formed thereon. While various materials may be used to form these paths or resistance heating elements, preferred compositions comprise conductive metal pastes. These materials, sometimes also referred to as inks, are applied to the glass sheets by conventional silk screen processes or painting and then are heated or fired to fuse the material to the sheet.

Typically the pastes comprise conductive metal particles, e.g., silver, glass frit particles and organic binders and solvent. The glass frit in addition to fusing the heating elements or strips to the sheet, also serves as an extender by which the desired conductivity or resistivity is achieved in the paths or elements. In other words, for a given cross-sectional area of the elements, the silver, which imparts electrical conductivity thereto, can be diluted or extended with the glass frit to attain the desired resistance which in turn determines the heat developed in the paths and glass immediately adjacent thereto.

A specific material which may be employed with good results is a silver paste containing approximately 80 percent by weight silver and 20 percent by weight glass frit and organic binders and solvent. This material has a resistance of approximately 4.5 ohms per foot at room temperature when applied to a glass sheet in a 0.030 inch wide line using a 160 mesh screen. In general, the conductive silver pastes may be fired at temperatures between 800° F. and 1,400° F. with the organic binders and solvents being burnt off at these temperatures.

Although the conductive silver pastes are ideally suited for forming the electrically conducting paths, other conductive metal pastes may be used, e.g., those containing gold, palladium, platinum, and alloys thereof. In addition, air drying dispersions of conducting metals may be employed. One particular material of this type which has been used successfully is "Dag 422," a dispersion of silver plus graphite in a water carrier obtained from the Acheson Colloids Company, Port Huron, Mich. Also, materials such as electrically conducting tapes which may or may not be removed after the bending step can be employed.

After the electrically conducting paths have been satisfactorily formed, the outboard glass sheet 12 is positioned on the bending mold by supporting the transverse edges of the sheet on the shaping surface of the mold (FIG. 3). The sheet 13, to form the inboard sheet of the windshield, is then superimposed upon the sheet 12 such that the electrically conducting path or frit line 16 is parallel to and in the same vertical plane as the line 15 formed on the sheet 12. If desired, a parting agent such as a very light coating of a commercial talc may be sprayed on at least one of the contacting surfaces of the superimposed sheets to prevent sticking thereof during bending. Leads 25 and 26 from a suitable electrical power source (not shown) are then placed in electrical contact with the paths 15 and 16 through alligator clips or the like 27 and 28 respectively (FIG. 4).

Prior to supplying power to the leads 25 and 26 the bending mold and glass sheets carried thereby are preferably heated to a relatively high temperature, for example, above the strain point of the glass but below the temperature at which the glass bends to any significant degree. In this respect, temperatures in the range of approximately 900° to 1,150° F. have been found useful. This heating may suitably be accomplished by conveying the mold through a furnace. The purpose of this preliminary heating treatment is to prevent inducing permanent stresses in the glass, obviate the tendency of the glass to crack when it is subsequently heated locally along the electrically conducting path to its bending temperature, and also to enable the accomplishment of this latter step in a time which is acceptable from a commercial standpoint and with the use of a reasonable amount of electrical energy.

Upon the glass sheets reaching the desired overall temperature, power is supplied to the leads 25 and 26 and consequently to the elements 15 and 16. This in turn heats the glass sheets immediately adjacent or underlying the elements to a temperature above the bending temperature of the glass, for example, above approximately 1,200° F., at which time the sheets bend sharply along the paths and settle by gravity into the generally V-shaped configuration illustrated in FIG. 5.

The sheets are then cooled to room temperature, cleaned and laminated in the conventional manner.

FIG. 6 illustrates the upper rear section of an automobile 30 in which a V-shaped rear window or backlight 31 produced in accordance with the invention is incorporated. The backlight 31 (FIG. 7) may be produced by the same method discussed above in connection with the windshield 10, a frit line or other electrically conductive path 32 being provided extending transversely across the glass sheet medially of and parallel to its transverse edges 33 and 34.

As a specific example of bending the backlight 31 or other single glass sheet into a generally V-shaped structure in accordance with the method of the invention, a glass sheet 0.090 inch thick was procured. A composition comprised of 85 percent by weight of a conductive silver preparation, i.e., composed of silver particles, solvent, binder and frit, marketed by E. I. duPont de Nemours and Company under the designation "8375," and 15 percent by weight of duPont conductive material "8151" comprising both silver and palladium particles, was then applied in a width of 0.030 inch across the sheet intermediate two opposed edges thereof and parallel thereto by a silk screen printing process. This sheet was supported at these two opposed edges only on a mold and heated in a furnace set to a temperature of 1,150° F. During this heating, the finely divided metal ceramic frit fuses onto the glass surface. The glass and integral frit line were then allowed to cool to room temperature where electrical measurement showed the frit to have a resistance of 4.43 ohms per foot. Electrical connections such as shown in FIGS. 3 and 4 were then made to the frit lines and the mold-supported sheet again placed in the furnace and the furnace heated to a temperature of 1,150° F. When this temperature was obtained, electrical energy was supplied to the frit line and, more particularly, a potential of 45 volts maximum was applied across the sheet resulting in a current of 3 amperes. This power was applied for 15 minutes at which time the sheet had assumed a generally V-shape appearance, the bend occurring at and along the frit line. The sheet was then removed from the furnace and cooled quickly to produce a tempered structure.

It should be noted that it is not necessary that the sheet be allowed to cool down after firing of the frit and then reheated for the bending step. This was done in the above example solely for obtaining an accurate measurement of the resistance of the frit line. Once this resistance is known, the reheating step in subsequent operations under the same conditions may be eliminated.

In order to produce a laminated structure of the type illustrated in FIG. 2, two sheets of identically sized and shaped 0.090 inch thick glass sheets were each provided with a 0.030 inch wide frit line of the composition recited above intermediate and parallel to two of the edges of the pieces and extending between the other edges thereof in a straight line path. The sheets were then heated in a furnace to a temperature of approximately 1,100° F. to fuse the frit into the surfaces of the sheets. Thereafter, the sheets were sprayed with a parting material, matched, and supported on a mold as illustrated in FIGS. 3 and 4 with the frit lines on the outboard surfaces thereof, and heated in a furnace set at a temperature of 1,150,° F. Clamps such as shown in FIG. 4 were then attached to the frit lines and a potential of 45 volts maximum was applied to the frit lines for 15 minutes resulting in a current of 6 amperes total or 3 amperes through each line. At the conclusion of this time, the sheets were bent to a substantially V-shaped configuration as illustrated in FIG. 5 and were thereafter allowed to cool slowly in air to room temperature to produce an annealed structure.

Another conductive paste which has been successfully employed in embodiments identical to those discussed above is obtained from the Drakenfeld Company, a division of Hercules Chemical Company, under the designation "Drakenfeld Conductive Silver Paste A-942." This is a silver metal, organic binder and glass frit composition containing in the range of from 75 to 80 percent by weight silver.

Although the electrically conducting paths, whether formed from the silver pastes, dispersions, tapes or other materials, are opaque, the fact that they are so narrow permits the method of the invention to be used to produce vehicle windows and other glazings where excellent visibility is essential. Further, while the invention has been described with the employment of an electrically conducting path on only one surface of the glass sheet or sheets to be bent, it should be noted that paths may be formed on both surfaces of each sheet if desired so long as the paths are directly opposed, i.e., lie in the same vertical plane when the sheet or sheets are disposed horizontally preparatory to bending. This serves to speed up to some extent the time required for the sheet to reach bending temperature along the plane defined by the paths.

As previously noted, to obtain a V-bend, the glass conductor interface must attain a temperature above 1,000° F., preferably a temperature in the range of from 1,200° to 1,350° F., and the areas of the glass sheet other than those immediately adjacent the electrically conducting path, should not attain bending temperature. However, it should be pointed out that after the V-bend is obtained, crossbend can be introduced into the sheet or sheets for aesthetic purposes by raising the overall temperature.

I claim:

1. A process for bending a glass sheet to a relatively sharp angle, comprising applying a layer of electrically conducting material to at least one surface of the sheet along a line about which it is desired to bend the sheet, applying an electrical potential across said line of a sufficient magnitude and for a time adequate to heat the sheet in the area immediately adjacent said line to a temperature above the bending point of the glass, and bending said sheet along said line to form said relatively sharp angle therein.

2. A process for bending a glass sheet to a relatively sharp angle, comprising applying a layer of electrically conducting material to at least one surface of a flat sheet of glass along a path about which it is desired to bend the sheet, said path extending continuously along a line from substantially one edge of the sheet to the opposite edge thereof, heating the sheet to an elevated temperature but below the bending temperature of the glass, passing an electrical current along said electrically conducting path to heat the sheet in the area immediately adjacent said path to a temperature above the bending point of the glass, and bending said sheet along said path to form said relatively sharp angle therein.

3. A process for bending a glass sheet as claimed in claim 2, wherein said sheet is heated to a temperature in the range of from 900° to 1,150° F. prior to passing said electrical current along said path, and said area immediately adjacent said path is heated to from 1,200° to 1,350° F. when said current is passed along said path.

4. A process for bending a glass sheet to a relatively sharp angle, comprising applying a layer of electrically conducting material to at least one surface of a flat sheet of glass to be bent, which layer extends continuously along a substantially straight line from one edge of the sheet to the opposite edge thereof, supporting the flat sheet along its marginal edge portions only above a shaping surface of a bending mold, heating the sheet to a temperature above the strain point of the glass but below the bending temperature thereof, applying an electrical potential across said line of a sufficient magnitude and for a time adequate to raise the temperature of the glass in the area immediately adjacent said line to its bending temperature, and bending said sheet by gravity along said line into conformity with the shaping surface of the mold.

5. A process for bending a glass sheet as claimed in claim 4, wherein said electrically conducting layer is produced by stenciling an electrically conducting metal and frit containing paste on the glass surface and thereafter firing said paste to fuse the metal to the glass.

6. A process for bending a pair of glass sheets to a relatively sharp angle, comprising applying a layer of electrically conducting material to at least one surface of each of two similarly sized and shaped flat glass sheets to be bent to form paths which extend continuously along substantially straight lines from one edge of each sheet to the opposite edge thereof, superimposing one of said sheets upon the other such that said electrically conducting paths lie in the same vertical plane, heating the assembled sheets to an elevated temperature but below the bending temperature of the glass, applying an electrical potential across each of said paths of sufficient magnitude and for a time adequate to heat each sheet in the area immediately adjacent said paths to a temperature above the bending temperature of the glass, and bending said sheets along said paths to form said relatively sharp angle therein.

7. A process for bending a pair of glass sheets to a relatively sharp angle, comprising applying a layer of electrically conducting material to one surface of each of two similarly sized and shaped flat glass sheets to be bent to form paths which extend continuously along a substantially straight line from one edge of each sheet to the opposite edge thereof, superimposing one of said sheets upon the other such that said electrically conducting paths lie in the same vertical plane with said one surface of each being the outwardly disposed surfaces of the assembly, supporting the assembly along its marginal edge portions only above a shaping surface of a generally horizontally disposed bending mold, heating the assembled sheets to a temperature above the strain point of the glass but below the bending temperature thereof, passing an electrical current through both of said electrically conducting paths of a sufficient magnitude and for a time adequate to raise the temperature of the area immediately adjacent thereto on both sheets to the bending temperature of the glass, and bending said sheets along said paths into conformity with said shaping surface of the mold to form a generally V-shaped structure.

8. A process as defined in claim 7, wherein said electrically conducting paths are produced by stenciling an electrically conducting metal and frit containing paste on the glass surface and thereafter firing said paste to fuse the metal to the glass.

9. A process for bending a glass sheet to a relatively sharp angle, comprising applying an electrically conducting metal containing glass frit suspension in a thin path to at least one surface of a flat glass sheet to be bent, which path extends continuously along a substantially straight line from one edge of the sheet to the opposite edge thereof, supporting the flat sheet along a portion of its marginal edge only above a shaping surface of a bending mold, heating the sheet to a temperature above the strain point of the glass but below the bending temperature thereof to fuse the metal glass frit suspension to the glass, applying an electrical potential across the fused path of a sufficient magnitude and for a time adequate to raise the temperature of the glass sheet in the area immediately adjacent said path to its bending temperature, and bending said sheet along said path into conformity with the shaping surface of the mold.

10. A process for bending a glass sheet as defined in claim 9, wherein said suspension is applied to said sheet by a silk screen process and said sheet is heated to a temperature in the range of from 900° F. to 1,150° F. to fuse said metal glass frit suspension to the sheet.

* * * * *